US012389882B2

(12) United States Patent
Soori-Arachi

(10) Patent No.: US 12,389,882 B2
(45) Date of Patent: Aug. 19, 2025

(54) OFF-LEASH PET TRAINING DEVICE

(71) Applicant: Marcus Charles Bernard Soori-Arachi, Fort Myers, FL (US)

(72) Inventor: Marcus Charles Bernard Soori-Arachi, Fort Myers, FL (US)

( * ) Notice: Subject to any disclaimer, the term of this patent is extended or adjusted under 35 U.S.C. 154(b) by 0 days.

(21) Appl. No.: 19/080,390

(22) Filed: Mar. 14, 2025

(65) Prior Publication Data
US 2025/0204495 A1 Jun. 26, 2025

Related U.S. Application Data

(63) Continuation of application No. PCT/US2025/012296, filed on Jan. 20, 2025.

(51) Int. Cl.
*A01K 27/00* (2006.01)
*A01K 15/02* (2006.01)

(52) U.S. Cl.
CPC ............ *A01K 27/004* (2013.01); *A01K 15/02* (2013.01)

(58) Field of Classification Search
CPC ....... A01K 27/004; A01K 27/003; A01K 1/04
See application file for complete search history.

(56) References Cited

U.S. PATENT DOCUMENTS

| | | | |
|---|---|---|---|
| 3,964,441 A * | 6/1976 | Wall | A01K 27/004 119/796 |
| 5,375,561 A * | 12/1994 | Gundersen | B62J 11/20 119/771 |
| 6,318,302 B1 * | 11/2001 | Bedient | A01K 1/04 119/786 |
| 6,827,045 B1 | 12/2004 | Willner et al. | |
| 7,926,452 B1 * | 4/2011 | Kim | A01K 1/04 119/799 |
| 9,107,391 B1 | 8/2015 | Mcguire | |
| 10,412,934 B2 | 9/2019 | Max et al. | |
| 10,602,720 B1 | 3/2020 | Schwartz | |
| 11,439,128 B2 | 9/2022 | Dugan | |
| 2006/0027189 A1 | 2/2006 | Luber | |
| 2007/0039563 A1 * | 2/2007 | Keller | A01K 27/003 119/799 |
| 2017/0367302 A1 | 12/2017 | Caudill | |

(Continued)

OTHER PUBLICATIONS

PCT International Search Report and Written Opinion dated Mar. 14, 2025, PCT International Application No. PCT/US2025/012296, pp. 1-13.

*Primary Examiner* — Kristen C Hayes
(74) *Attorney, Agent, or Firm* — Outlier Patent Attorneys, PLLC

(57) ABSTRACT

A pet training apparatus is designed to prepare for off-leash walking and other activities. The apparatus includes a leash housing having a handle portion and a reel housing portion. A leash includes a proximal end coupled to a reel in the reel housing portion, and a distal end having a connector configured for attaching to a pet collar or harness. The leash is retractable and the leash housing has an opening through which the leash extends. An angle adjuster is coupled to the leash housing and configured to rotate relative to the leash housing. An elongate rod is coupled to the angle adjuster. The leash is coupled to, and axially extendable and retractable relative to, the elongate rod such that an angle of the leash relative to the leash housing is selected by rotating the angle adjuster so that the elongate rod is at a desired angle.

20 Claims, 5 Drawing Sheets

(56) References Cited

U.S. PATENT DOCUMENTS

| | | |
|---|---|---|
| 2021/0274747 A1* | 9/2021 | Sells .................. A01K 1/04 |
| 2021/0368741 A1 | 12/2021 | Duffin |
| 2022/0361454 A1 | 11/2022 | Phillips et al. |

* cited by examiner

OFF-LEASH PET TRAINING DEVICE

CROSS-REFERENCE TO RELATED APPLICATIONS

This Application is a by-pass continuation of International Application No. PCT/US25/12296, filed on Jan. 20, 2025, which claims priority to U.S. Provisional Patent Application No. 63/601,203 filed on Nov. 20, 2023, entitled "Off-Leash Pet Training Device," the contents of which are incorporated herein by reference.

BACKGROUND

Field of the Art

The present invention relates to the field of pet training devices. In particular, the present invention relates to the field of leashes for training pets to maintain a desired position relative to the person walking the pet.

Discussion of the State of the Art

The task of walking a pet on a leash is a common yet complex one, fraught with difficulties for both the pet and the owner. Regardless of whether a fixed-length leash or an adjustable, retractable leash is used, maintaining a comfortable distance between the pet and the owner can be a challenge. The ideal positioning is such that the pet is either next to or slightly behind the owner, allowing the pet to feel secure and guided, and facilitating the pet's ability to interpret the owner's body language and vocal commands. However, the current designs of both rope leashes and retractable leashes are not conducive to achieving this optimal positioning.

The primary issue lies in the connection point of the leash to the pet's collar. In all cases, the leash creates an angle forward-of-vertical, meaning that the owner's hand is always "behind" the collar in the vertical plane. This default positioning places the pet in front of the owner, contrary to the desired positioning of the pet next to or slightly behind the owner. This misalignment complicates the process of off-leash training, which aims to train the pet to walk comfortably and obediently without the use of a leash.

Existing solutions to this problem are far from satisfactory. The most common method involves the owner holding their arm behind them after fixing the loose leash length. This forces the pet to align next to or slightly behind the owner's leg or hip point in the vertical plane. However, this solution has several drawbacks. Firstly, it can lead to arm fatigue for the owner or trainer, reducing their physical and mental endurance for pet training. Secondly, the awkward arm angle reduces the owner's strength to control the pet's movements, particularly in potentially dangerous situations. Finally, the inconsistency of the arm angle due to fatigue can lead to inconsistent positioning of the pet. This inconsistency can severely hinder effective training, as extreme consistency in pet placement is crucial for the pet to learn its desired location next to the owner over time. Consequently, the current solutions not only fail to effectively address the problem but also introduce additional difficulties and risks.

SUMMARY

The present invention is a pet training apparatus designed to facilitate off-leash walking and other activities. The apparatus allows the user to maintain a relaxed position while effectively positioning their pet for optimal training. The pet training apparatus, which attaches to the pet's collar to position the pet at a desired angle relative to the user of the apparatus, can be adjusted based on the height of the pet and the user's desired distance of the pet from the user's hip (next to or at a distance behind the hip), providing a comfortable experience for both the pet and the user.

The apparatus comprises a leash housing that includes a handle portion and a reel housing portion. A retractable leash is disposed within the reel housing portion and the retractable leash exits the housing through an opening in the reel housing portion. The reel housing portion also includes an angle adjuster and an elongate rod coupled to the angle adjuster. The elongate rod may be rigid or semi-rigid. The leash is coupled to the rod in order to control the angle between the pet and the user. It includes "hold" and "lock" buttons that can control the leash length individually or in combination.

The pet training apparatus in accordance with the present invention addresses the shortcomings of existing leashes used for off-leash training by ensuring the pet's position is consistently next to or behind the owner. This is achieved through the use of a semi-rigid or rigid rod that fixes its length and thus the distance of the pet next to or behind the user's hip/leg and is attached to a rotating mechanism in the housing that may adjust its angle to properly position the pet based on the user's and pet's height, and the user's preferred positioning of the pet. The consistent positioning provided by the apparatus not only offers a relaxed arm angle for the user but also facilitates the pet's learning of its desired place, making the training process more efficient and effective.

The primary benefits of the invention are its ability to maintain a consistent pet position relative to the user/owner/trainer, the relaxed arm position it allows for the user/owner/trainer, and the improved efficiency and effectiveness of pet training. Key elements of the invention include the rotating and locking angle adjuster on the leash housing and the fixed or extendible rigid or semi-rigid rod.

In one example, the present invention is a pet training apparatus that includes a leash housing having a handle portion and a reel housing portion. The apparatus further includes a leash having a proximal end coupled to a reel in the reel housing portion, and a distal end having a connector configured for attaching to a pet collar or harness. The leash is retractable and the leash housing includes an opening through which the leash extends. The apparatus further includes an angle adjuster coupled to the leash housing and configured to rotate relative to the leash housing. Still further, the apparatus includes an elongate rod coupled to the angle adjuster. The leash is coupled to, and axially extendable and retractable relative to, the elongate rod such that an angle of the leash relative to the leash housing is selected by rotating the angle adjuster so that the elongate rod is at a desired angle. The elongate rod may be a hollow tube and the leash may pass through the hollow tube. Alternatively, the leash may be coupled to an outer surface of the elongate rod along a length of the elongate rod. The angle adjuster may rotate relative to the leash housing and may be configured for being locked in place when the elongate rod is at the desired angle. The angle adjuster may include a friction fit mechanism, ratchet and spring system, or one-way ratcheting mechanism. The elongate rod may have an adjustable length. The elongate rod may be fixedly or removably coupled to the angle adjuster. The elongate rod may be rigid or semi-rigid.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1:
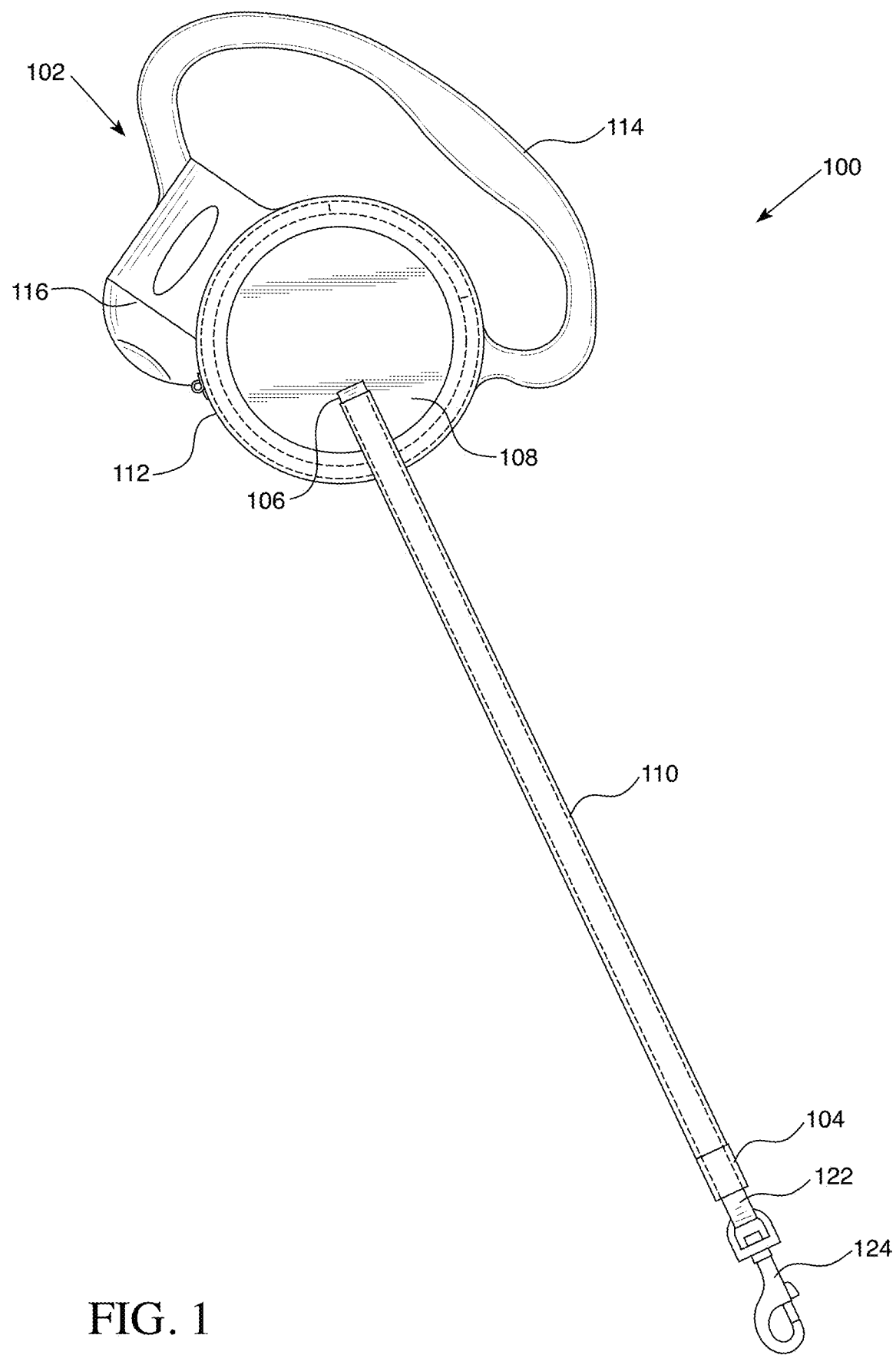
FIG. 1 illustrates a pet training device, in accordance with an aspect of the present invention.

The present invention is for a pet training device that trains a pet to walk off-leash. The device includes an angle adjustment mechanism so that proper positioning between the pet and the user can be maintained during a walk. By using the device to train the pet to walk alongside or slightly behind the user, the pet will then be ready to safely and effectively walk without a leash.

The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Apparatus

Figure 3:
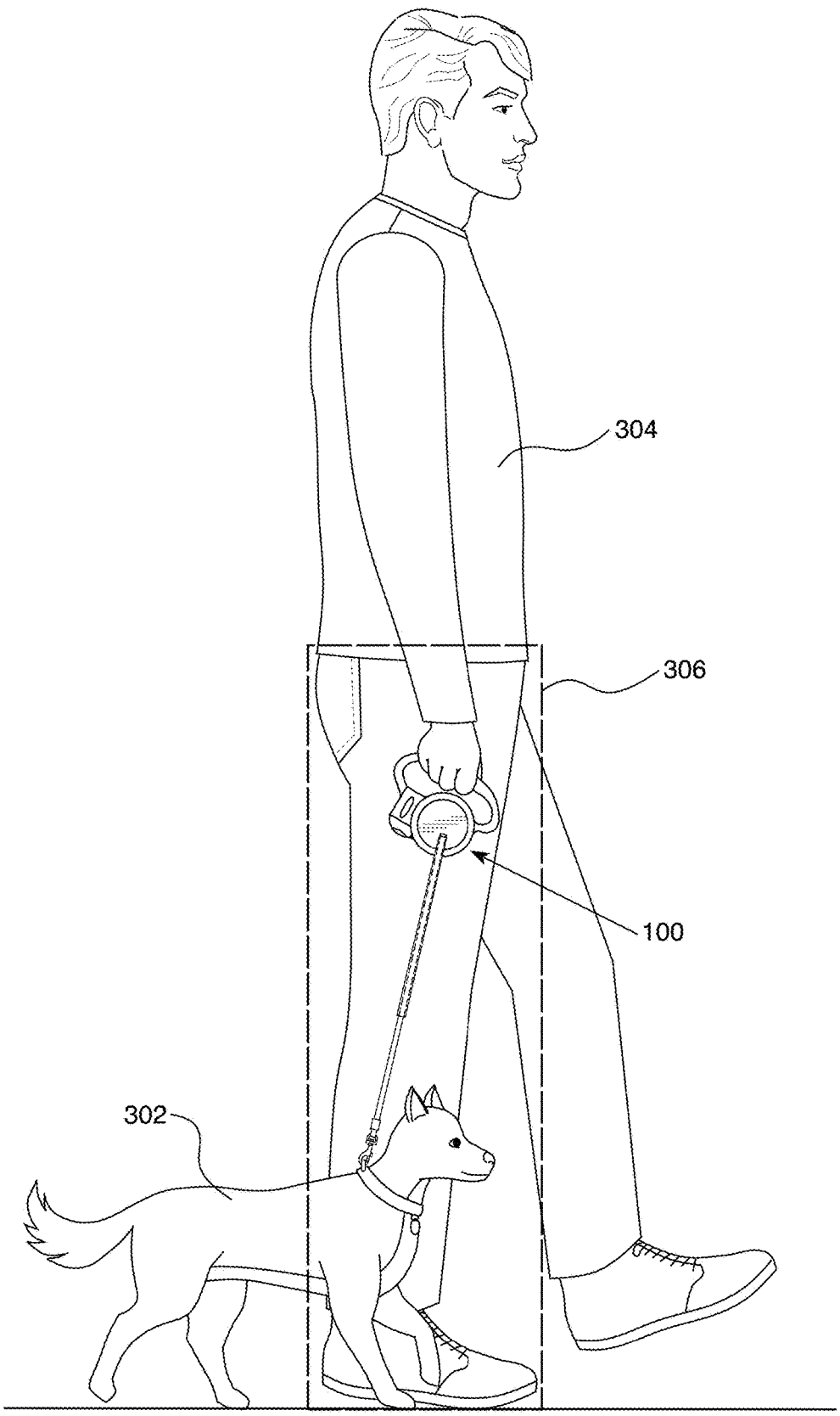
FIG. 3 illustrates the pet training device in use for maintaining desired positioning between a pet and a user, in accordance with an aspect of the present invention.

As shown in FIG. 1, a pet training apparatus 100 in accordance with the present invention includes a leash housing 102, a leash 104 that exits the housing 102 through an opening 106 in the housing 102, an angle adjuster 108 coupled to the leash housing 102, and an elongate rod 110 that is coupled to the angle adjuster 108. As discussed in further detail below, the angle adjuster 108 and the elongate rod 110 may be used to fix the angle between a pet that is coupled to the distal end of the leash 104 and a user that is holding the leash housing 102 while walking with the pet. In this manner, the pet is maintained in a desired position relative to the user. That is, the position of the pet is maintained to be next to or behind the user. FIG. 3 depicts the desired zone 306 for the pet 302 relative to the user 304.

Referring back to FIG. 1, the leash housing 102 is similar to a conventional leash housing for a retractable leash in that the leash housing 102 includes a leash reel housing portion 112 and a handle portion 114. The housing handle portion 114 is ergonomically designed to provide a comfortable grip for the user, enhancing the overall user experience. The leash housing 102 may further include a holder 116 for waste bags. The leash 104 extends out of, and retracts into, the housing 102 through the opening 106 in the housing 102.

Inside the reel housing portion 112 is a spring-loaded leash reel, which is designed to hold and manage the leash 104. This reel is spring-loaded to facilitate the retraction of the leash 104, providing a controlled extension and retraction mechanism for the leash 104.

The leash housing 102 may further include a brake and a lock (not shown) similar to those found in conventional retractable leash housings. The leash brake button and leash lock button are additional features that may be integrated into the housing 102. The hold button allows the user to maintain the leash 104 at a desired length temporarily, while the lock button provides a more permanent fixation of the leash length.

The leash 104 has a proximal end (not shown) fixedly coupled to the reel within the reel housing portion 112 and a distal end 122 that includes a connector 124 configured to attach to a collar, harness, or similar device worn by the pet. The leash 104 may be a cord, strap, lead, lead line, leash cable, leash tape, rope, or the like. The leash 104 may be made of nylon, wool, hemp, natural fibers, leather, rope, or the like. The leash 104 may have a square, rectangular, or round cross-sectional shape.

An intermediate portion of the leash 104 is coupled to the elongate rod 110. The elongate rod 110 may be rigid or semi-rigid. For example, the elongate rod 110 may be made of metal or rigid plastic. In one example, shown in FIG. 1, the elongate rod 110 is a hollow tube and the leash 104 passes through the elongate rod 110 and is configured to axially extend and retract relative to the elongate rod 110. In another example, the leash 104 is coupled to the elongate rod 110 along the external surface of the elongate rod 110. The elongate rod 110 may include guides coupled to the outer surface of the elongate rod 110 along the length of the elongate rod 110 for holding the leash 104 in place alongside the rod 110. The guides in this example are similar to guides on a fishing pole that hold the fishing line in place alongside the fishing pole.

The elongate rod 110 may have an adjustable length. For example, the elongate rod 110 may include telescoping segments that can be extended or retracted depending on the desired length of the elongate rod 110. In other examples, the length of the rod 110 may be adjusted by various means such as friction-fixed telescoping, spring-button fixed telescoping, or spring-loaded fixed-length-open and fixed-length-closed telescoping. This allows for further customization of the apparatus 100 to cater to the specific needs of the user and pet.

A distal end of the elongate rod 110 is positioned near the pet, while the proximal end of the elongate rod 110 is coupled to an angle adjuster 108 that is configured to rotate relative to the leash housing 102. The elongate rod 110 may be fixedly coupled to the angle adjuster 108 or may be removably coupled to the angle adjuster 108. For example, the elongate rod 110 and the angle adjuster 108 may be made of a single, unitary piece, or may be coupled together by fusion or welding. The elongate rod 110 may be removably coupled to the angle adjuster 108 using screws, snaps, or other fasteners.

By rotating the angle adjuster 108 relative to the leash housing 102, the angle of the elongate rod 110 is adjusted to a desired angle. The desired angle depends on the size of the pet, the height of the user, and the desired angle between the pet and the user. The angle adjuster 108 is rotated until the elongate rod 110 is at a desired angle and then the angle adjuster 108 is locked in place. The adjustment caters to the height of the user and the pet, ensuring mutual comfort during walking and off-leash training. The rotation of the angle adjuster 108, which is connected to the elongate rod 110, directly influences the angle of the elongate rod 110 relative to the leash housing 102 and the ground. For instance, the elongate rod 110 will assume a more horizontal position for a taller pet and/or shorter user, and a more vertical position for a taller user and/or shorter pet.

Figure 2A:
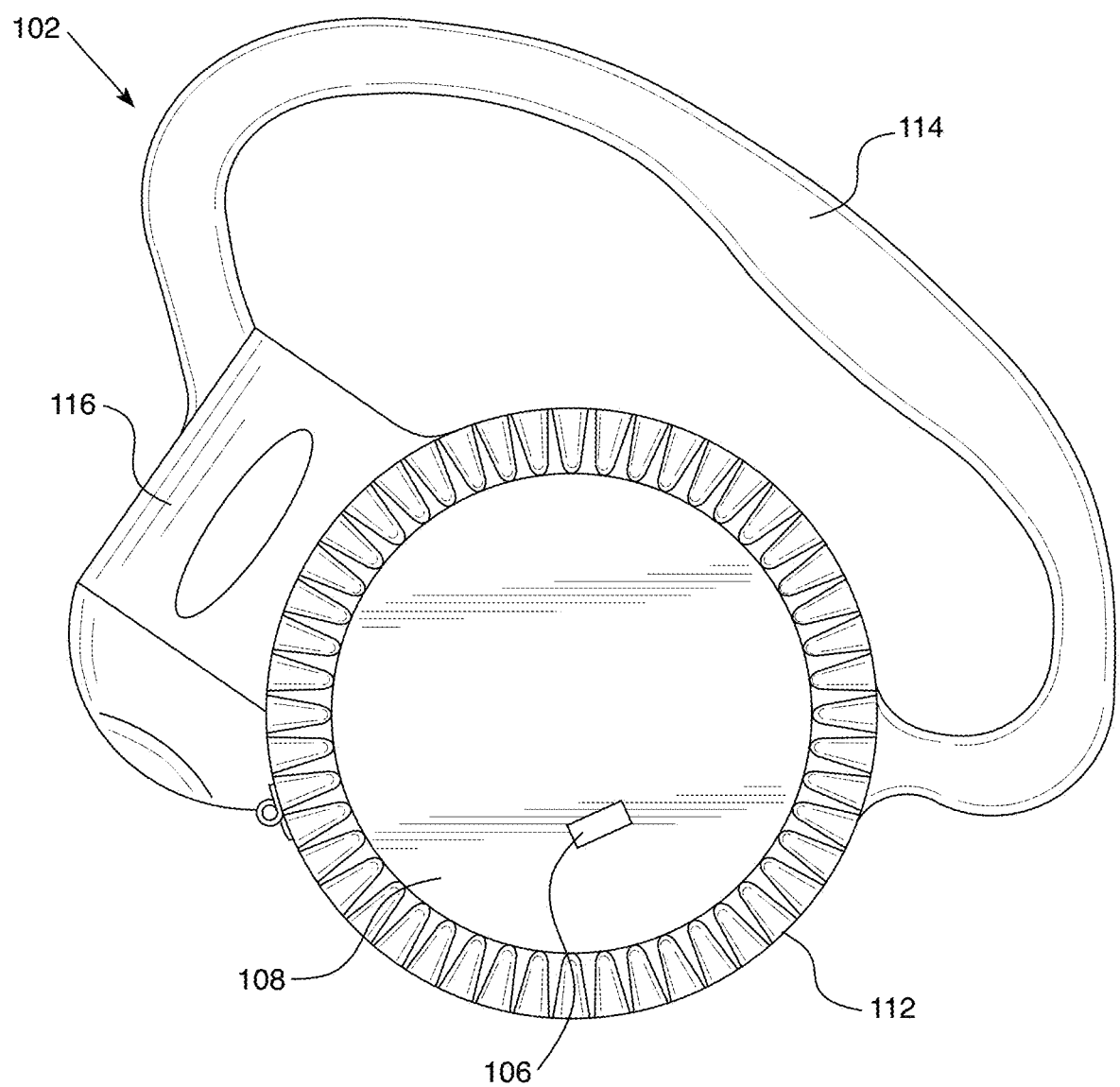
FIGS. 2A-2C illustrate examples of angle adjustment mechanisms, in accordance with aspects of the present invention.

The apparatus 100 is not limited to a particular mechanism for adjusting and locking the angle of the angle adjuster 108. Some exemplary angle adjustment mechanisms are described with reference to FIGS. 2A-2C. As shown in FIG. 2A, the angle adjuster 108 rotates relative to the housing 102 in a manner similar to a rotating watch bezel. The angle adjuster 108 includes an internal ratchet and spring system that allows the angle adjuster 108 to rotate and then maintains the angle adjuster 108 in the desired position with a retaining spring.

Figure 2B:
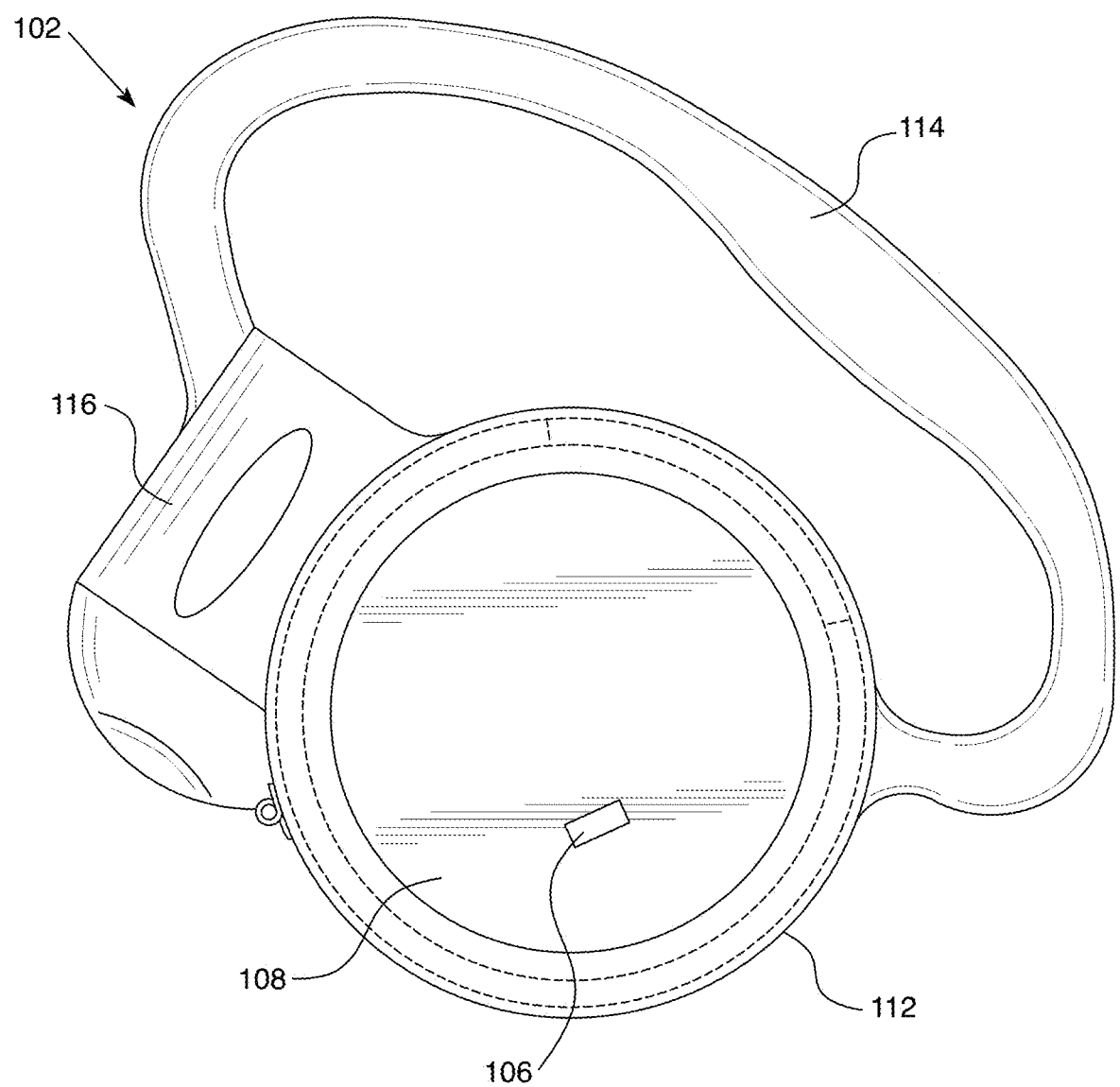

As shown in FIG. 2B, the angle adjuster 108 may include a friction fit between the angle adjuster 108 and the leash housing 102. The force applied to rotate the angle adjuster 108 is sufficient for overcoming the friction between the angle adjuster 108 and the leash housing 102.

Figure 2C:
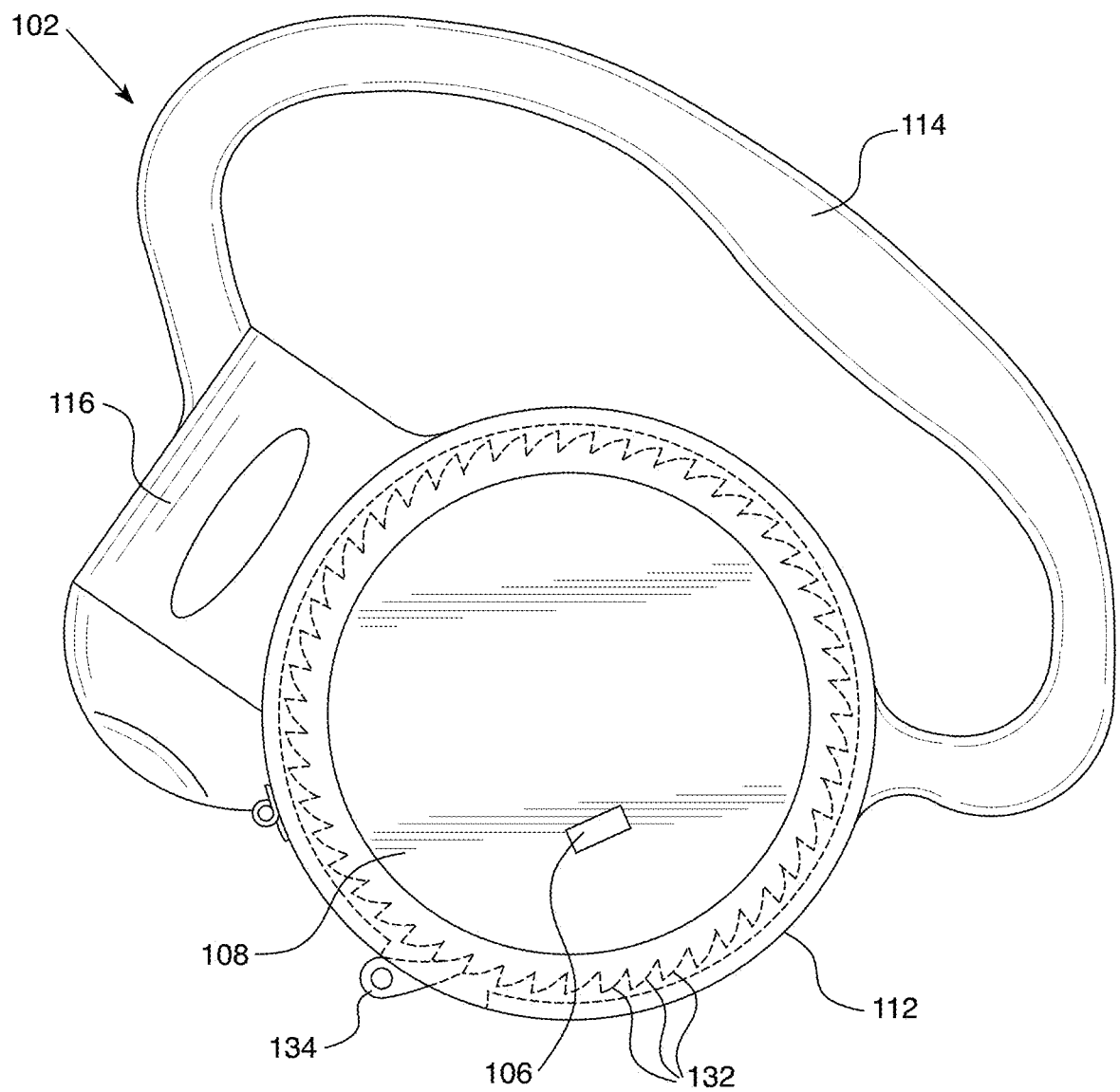

In another example, shown in FIG. 2C, the angle adjuster 108 includes radially projecting teeth 132 and the housing 102 includes a pawl 134 that can be pushed into place (either manually or with a spring-loaded mechanism) when the elongate rod 110 is at the desired angle.

Alternative rotating and/or locking systems may be employed without departing from the scope of the invention. For instance, in one embodiment, a rotating locking and/or ratcheting system may have an outer diameter section of the system exposed, allowing for a flap-based snap lock to fix the position of the rotating system. In another embodiment, a rotating locking and/or ratcheting system may have an outer diameter section of the system exposed, enabling a slide-based friction lock to fix the position of the rotating system.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and/or a process associated with the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A pet training apparatus, comprising:
a leash housing comprising a handle portion and a reel housing portion;
a leash having a proximal end coupled to a reel in the reel housing portion, and a distal end comprising a connector configured for attaching to a pet collar or harness, wherein the leash is retractable and wherein the leash housing comprises an opening through which the leash extends;
an angle adjuster coupled to the leash housing and configured to rotate relative to the leash housing; and
an elongate rod coupled to the angle adjuster, wherein the leash is coupled to, and axially extendable and retractable relative to, the elongate rod such that an angle of the leash relative to the leash housing is selected by rotating the angle adjuster so that the elongate rod is at a desired angle, and wherein the elongate rod is a hollow tube and the leash passes through the hollow tube.

2. The pet training apparatus of claim 1, wherein the leash is coupled to an outer surface of the elongate rod along a length of the elongate rod.

3. The pet training apparatus of claim 1, wherein the angle adjuster rotates relative to the leash housing and is configured for being locked in place when the elongate rod is at the desired angle.

4. The pet training apparatus of claim 1, wherein the angle adjuster comprises a friction fit mechanism, ratchet and spring system, or one-way ratcheting mechanism.

5. The pet training apparatus of claim 1, wherein the elongate rod has an adjustable length.

6. The pet training apparatus of claim 1, wherein the elongate rod is fixedly coupled to the angle adjuster or removably coupled to the angle adjuster.

7. The pet training apparatus of claim 1, wherein the elongate rod is rigid.

8. A pet training apparatus, comprising:
a leash housing comprising a handle portion and a reel housing portion;
a leash having a proximal end coupled to a reel in the reel housing portion, and a distal end comprising a connector configured for attaching to a pet collar or harness, wherein the leash is retractable and wherein the leash housing comprises an opening through which the leash extends;
an angle adjuster coupled to the leash housing and configured to rotate relative to the leash housing; and
an elongate rod coupled to the angle adjuster, wherein the leash is coupled to, and axially extendable and retractable relative to, the elongate rod such that an angle of the leash relative to the leash housing is selected by rotating the angle adjuster so that the elongate rod is at a desired angle, and wherein the angle adjuster rotates relative to the leash housing and is configured for being locked in place when the elongate rod is at the desired angle.

9. The pet training apparatus of claim 8, wherein the elongate rod is a hollow tube and the leash passes through the hollow tube.

10. The pet training apparatus of claim 8, wherein the leash is coupled to an outer surface of the elongate rod along a length of the elongate rod.

11. The pet training apparatus of claim 8, wherein the angle adjuster comprises a friction fit mechanism, ratchet and spring system, or one-way ratcheting mechanism.

12. The pet training apparatus of claim 8, wherein the elongate rod has an adjustable length.

13. The pet training apparatus of claim 8, wherein the elongate rod is fixedly coupled to the angle adjuster or removably coupled to the angle adjuster.

14. The pet training apparatus of claim 8, wherein the elongate rod is rigid.

15. A pet training apparatus, comprising:
a leash housing comprising a handle portion and a reel housing portion;
a leash having a proximal end coupled to a reel in the reel housing portion, and a distal end comprising a connector configured for attaching to a pet collar or harness, wherein the leash is retractable and wherein the leash housing comprises an opening through which the leash extends;
an angle adjuster coupled to the leash housing and configured to rotate relative to the leash housing; and
an elongate rod coupled to the angle adjuster, wherein the leash is coupled to, and axially extendable and retractable relative to, the elongate rod such that an angle of the leash relative to the leash housing is selected by rotating the angle adjuster so that the elongate rod is at a desired angle, and wherein the angle adjuster comprises a friction fit mechanism, ratchet and spring system, or one-way ratcheting mechanism.

16. The pet training apparatus of claim 15, wherein the elongate rod is a hollow tube and the leash passes through the hollow tube.

17. The pet training apparatus of claim 15, the leash is coupled to an outer surface of the elongate rod along a length of the elongate rod.

18. The pet training apparatus of claim 15, the angle adjuster rotates relative to the leash housing and is configured for being locked in place when the elongate rod is at the desired angle.

19. The pet training apparatus of claim 15, wherein the elongate rod has an adjustable length and/or wherein the elongate rod is rigid.

20. The pet training apparatus of claim 15, wherein the elongate rod is fixedly coupled to the angle adjuster or removably coupled to the angle adjuster.

\* \* \* \* \*